United States Patent [19]

De Nora et al.

[11] 4,161,433
[45] Jul. 17, 1979

[54] DECOMPOSITION OF ALKALI METAL AMALGAMS

[75] Inventors: Oronzio De Nora, Milan, Italy; Antonio Nidola; Placido M. Spaziante, both of Lugano, Switzerland

[73] Assignee: Oronzio De Nora Impianti Elettrochimici S.p.A., Milan, Italy

[21] Appl. No.: 878,905

[22] Filed: Feb. 17, 1978

[30] Foreign Application Priority Data

Dec. 5, 1977 [IT] Italy ............................... 30381 A/77

[51] Int. Cl.² ............................. C25B 1/16; C25C 7/00; H01B 1/04; H01B 1/06
[52] U.S. Cl. .................................... 204/98; 204/249; 252/504; 252/507; 252/516
[58] Field of Search ....................... 204/249, 150, 98; 252/516, 504, 503, 507

[56] References Cited

U.S. PATENT DOCUMENTS

| | | | |
|---|---|---|---|
| 3,215,615 | 11/1965 | Ransley | 252/516 X |
| 3,512,220 | 5/1970 | Hund et al. | 204/249 X |
| 3,676,371 | 7/1972 | Zollner et al. | 252/507 |
| 3,875,039 | 4/1975 | Matusek et al. | 204/249 X |
| 3,981,490 | 9/1976 | Rousar et al. | 204/249 X |
| 4,042,656 | 8/1977 | Chuiruk et al. | 252/507 X |

*Primary Examiner*—John H. Mack
*Assistant Examiner*—D. R. Valentine
*Attorney, Agent, or Firm*—Hammond & Littell

[57] ABSTRACT

A novel polyphase packing for alkali metal mercury amalgam denuders comprised of a sintered mixture of powdered valve metal borides and valve metal carbides, a novel amalgam denuder containing the said polyphase packing and a novel process of decomposing alkali metal mercury amalgam by contacting the amalgam with an aqueous media in the presence of the said polyphase packing.

18 Claims, No Drawings

1

DECOMPOSITION OF ALKALI METAL AMALGAMS

STATE OF THE ART

At the present, graphite and activated graphite are extensively used for the decomposition of alkali metal mercury amalgams which are produced in plants equipped with mercury cathode cells for electrolysis of aqueous alkali metal chloride solutions. For example, in the production of chlorine and caustic soda from sodium chloride brine, the brine flows through a mercury cell wherein chlorine is evolved at the anode while sodium deposits on the mercury cathode giving rise to sodium amalgam which is continuously withdrawn from the cell to be sent to an apparatus called a denuder wherein it is reacted with water in the presence and in contact with a catalyst to produce caustic soda and hydrogen according to the following reaction:

$$2Na(Hg) + 2H_2O \rightarrow 2NaOH + H_2 + Hg$$

and the restored metallic mercury is recycled to the cell.

Although this reaction is thermodynamically favored, it can proceed at a practically useful rate only if it is catalyzed by the presence of a suitable catalyst whereby the reaction acquires the characteristics of an electrochemical process.

A denuder may be conceived as a large number of short-circuited galvanic microcells wherein the catalyst performs the role of the cathode (positive pole) to evolve hydrogen on areas of the catalyst having cathodic characteristics and performs the role of the anode (negative pole) to transfer the sodium ions in the amalgam to the aqueous phase on areas of the catalyst having anodic characteristics. The electrochemical process may be illustrated by the following equations.

Anodic reaction $2NaHg \rightarrow 2Na^+ + 2Hg + 2e$

Cathodic $2H_2O + 2e \rightarrow 2OH^- + H_2$

The electrochemical process will take place only if the cathodic areas are electrically connected to the anodic areas of the packing and the rate of the reaction will be controlled by the following three factors: anodic reaction; cathodic reaction; and electronic conduction through the bulk of the catalyst material connecting the cathodic and anodic areas. Usually, a commercial amalgam denuder consists of a steel vessel with the majority of its volume filled with a porous, static bed of catalytic material through which the amalgam percolates downwardly.

The catalytic material used to fill or pack a denuder should fulfill the following requisites: having anodic areas wettable by amalgam; have cathodic areas of low hydrogen overvoltage not wetted by amalgam which would hinder the cathodic reaction due to the high overvoltage opposed by mercury to hydrogen discharge; have good electrical conductivity; be insoluble in mercury and aqueous alkali metal hydroxide solutions; have a low or moderate cost; and have anodic and cathodic areas forming galvanic micro cells to reduce ohmic drop in the electrolyte.

Until now, graphite has practically remained the only acceptable commercial catalytic packing material and before the present invention, no conductor having metallic properties has been successfully used commerically. Steel, for instance, although it is a cheap metal with very good electrical conductivity and a relative low hydrogen overvoltage, is very quickly amalgamated by the mercury and consequently, its amalgam decomposition activity decreases rapidly. Graphite, on the contrary, although it exhibits a higher hydrogen overvoltage and lower conductivity than steel and other metals, remains unwetted by mercury on the cathodic areas under all conditions and shows a decomposition rate for amalgam not very high but constant.

Also, in the case of graphite activated by nickel and molybdenum oxides as described in FIAT Report No. 816, Office of Technical Services, Washington, D.C. 1946 and Jaksic, Electrochemical Technology, Vol. 4, 1966, pages 49–56, the amalgam decomposition rate is incresed due to the presence of cathodic areas containing oxides having a low hydrogen overvoltage, but the general electrochemical process of amalgam decomposition does not present very fast rates due to the low conductivity of graphite and to the great contact resistance between graphite and amalgam on the anodic areas.

Despite its better performance when compared with other materials, graphite is far from being an ideal catalyst for amalgam decomposition because it shows a considerable tendency to lose its activity through adsorption of impurities that might be present in the reaction water and whose poisoning effect sometimes becomes remarkable even when they are present in such minute amounts as to be undetectable by the most refined analytical methods. Whenever such activity loss occurs, it is necessary to shut down the electrolysis process in the cell so affected, drain the denuder and proceed to decontamination either by introducing steam or by acid washing which details considerable maintenance costs and a loss of production. Moreover, to obtain a safer and more regular operation, notwithstanding the inevitable occurrence of any contamination, the denuder is usually oversized which involves not only a higher initial cost for the equipment but also a larger holdup of mercury which is very expensive.

Recently, new monophase materials such as porous nickel, molybdenum and carbides, nitrides and oxides of valve metals have been proposed and although these materials offer higher reaction rates than that obtained with graphite and activated graphite, they are affected by a gradual activity loss in time and especially in the case of nickel oxides, a considerable weight loss is observed after a relatively short period of operation.

OBJECTS OF THE INVENTION

It is an object of the invention to provide a novel polyphase packing for alkali metal amalgam decomposition which doesn't have the above disadvantages.

It is another object of the invention to provide an improved alkali metal amalgam denuder of increased capacity.

It is an additional object of the invention to provide a novel process for decomposing an alkali metal amalgam with water.

These and other objects and advantages of the invention will become obvious from the following detailed description.

THE INVENTION

The novel polyphase amalgam denuder packing material of the invention is comprised of a sintered mixture of at least one powdered valve metal boride and at least one valve metal carbide and the said material remains active and stable under all operating decomposition conditions for a long duration.

Examples of suitable valve metals are tantalum, titanium, zirconium, hafnium, niobium, tungsten and silicon and mixtures thereof. Examples of specific polyphase materials are $ZrB_2 \cdot SiC$, $ZrB_2 \cdot ZrC$, $ZrB_3 \cdot SiC$, $ZrB_3 \cdot ZrC \cdot SiC$, $ZrB_2 \cdot WC \cdot SiC$ and $TiB_2 SiC$. The ratio of the valve metal borides and carbides may vary widely but is preferably 30 to 80% by weight of valve metal boride and 80 to 30% by weight of valve metal carbide. During the sintering process, it is possible that some of the components will form partial solid solutions such as valve metal carboborides.

In a preferred embodiment of the invention, the polyphase material may also contain 1 to 30% by weight of graphite to improve the properties thereof. Examples of suitable ternary materials are $ZrB_2 \cdot SiC \cdot C$, $ZrB_2 \cdot ZrC \cdot C$, $TiB_2 SiC \cdot C$ and $ZrB_2 \cdot TaC \cdot C$.

As another preferred embodiment of the invention, the sintered polyphase material may further contain besides or in place of graphite, 0.5 to 10% by weight of at least one metal of group VIII of the Periodic Table such as iron, nickel, cobalt and mixtures thereof. Examples of said quaternary and ternary mixtures are $ZrB_2 \cdot SiC \cdot C \cdot Ni$, $ZrB_2 \cdot ZrC \cdot Ni$, $ZrB_3 \cdot SiC \cdot C \cdot Ni$, $ZrB_2 \cdot SiC \cdot C \cdot Fe$ and $ZrB_2 \cdot SiC \cdot Fe$.

Comparative tests show clearly that the polyphase materials of the invention are much more suitable than graphite or activated graphite or metal alloys for alkali metal amalgam decomposition. It is assumed, without being bound to this assumption, that the exceptional activity exhibited by the materials of the invention is due to the fact that the polyphase material, besides offering catalytic areas for hydrogen evolution unwettable by the amalgam, which are likely constituted by the valve metal carbide phase and eventually, partially, also by the graphite phase, present catalytic areas for the ionization (dissolution), of the alkali metal contained in the amalgam which are readily wettable by the amalgam. These areas are likely constituted, at least partially, by the valve metal boride phase and/or by the metals selected from Group VIII of the Periodic Table of Elements such as iron, nickel and cobalt.

Moreover, the polyphase material presents a high electrical conductivity due essentially to the valve metal boride phase which has a conductivity 50 to 100 times higher than that of the carbides and about 100 times higher than that of graphite. In fact, the high electrical conductivity of the polyphase material of the invention is the essential condition necessary to obtain the formation of "electric bridges" having low ohmic drop between the positive areas (catalytic areas for hydrogen evolution) and the negative areas (catalytic areas for the ionization of the alkali metal contained in the amalgam) which constitute the electrochemically active microcells of the decomposition process.

The sintered catalytic materials may be prepared by known powder metallurgy methods such as by grinding the materials, separately or together, to obtain a powder mixture, preferably with a grain size between 50 and 500 microns, forming the powder into a shape suitable for filling a denuder such as saddles, Raschig rings, balls, etc and heating the formed shapes at a bonding temperature, preferably of 800 to 1800° C. for a period of 1 to 30 hours followed by slow cooling to room temperature. The material can also be formed into pipes or cellular structures by extrusion of the materials before the sintering treatment.

The novel method of the invention of decomposing alkali metal mercury amalgams comprises contacting an alkali metal mercury amalgam with water in the presence of a sintered mixture of the polyphase valve metal boride-valve metal carbide catalytic materials of the invention.

The improved denuder of the invention is comprised of a container with a majority of its volume filled with a sintered catalytic mixture of valve metal boride and valve metal carbide, means for introducing alkali metal mercury amalgam at the top, means for introducing water, means for recovering hydrogen and means for removal of aqueous alkali metal hydroxide solution.

In the following example there are described several preferred embodiments to illustrate the invention. However, it should be understood that the invention is not intended to be limited to the specific embodiments.

EXAMPLE 1

A cylindrical vessel with an inner diameter of 90 mm and a height of 100 mm was immersed in a thermostatic water bath maintained at 80° C. and was provided with saddles of about 2 inches (5.08 cm) of the sintered material according to the invention, as specified in Table I, opportunely held down in the vessel, and 100 ml of aqueous 50% sodium hydroxide. Then 30 ml of sodium mercury amalgam containing 4% sodium was added to 60° C. and the vessel was closed. Stirring was effected with a magnetic stirrer floating on the amalgam. The hydrogen evolution rate reached a volume of 500 ml and the slope of the straight line obtained by plotting the amount of evolved hydrogen against time ($cm^2$ of Hg/min) gave the decomposition rate which is related to the surface area of the sintered material. The rate is expressed as ml of Hg (at 25° C.) per minute times $cm^2$. The catalytic materials were aged in a laboratory denuder for 100 hours and the activity test was repeated. The results obtained with the material of the invention as well as with graphite, activated graphite, molybdenum and on 30% iron-70% vanadium alloy are reported in Table I.

TABLE I

| Sample Composition | | Decomposition Rate in ml of H2 (25° C./1 min × $cm^2$) | |
|---|---|---|---|
| | | initial | after 100 hours |
| $ZrB_3$ | (60%) | 65 | 63 |
| SiC | (40%) | | |
| $ZrB_2$ | (50%) | 60 | 60 |
| ZrC | (50%) | | |
| $ZrB_3$ | (40%) | 63 | 61 |
| ZrC | (30%) | | |
| SiC | (30%) | | |
| $ZrB_2$ | (40%) | 60 | 56 |
| WC | (10%) | | |
| SiC | (50%) | | |
| $TiB_2$ | (50%) | 68 | 67 |
| SiC | (30%) | | |
| C | (20%) | | |
| $ZrB_2$ | (50%) | 68 | 66 |
| SiC | (20%) | | |
| C | (20%) | | |
| $B_4C$ | (10%) | | |
| $ZrB_3$ | (40%) | 79 | 73 |
| SiC | (30%) | | |
| C | (25%) | | |
| Ni | (5%) | | |
| $ZrB_2$ | (40%) | 75 | 68 |
| SiC | (30%) | | |
| C | (25% | | |
| Fe | (5%) | | |

TABLE I-continued

| Sample Composition | Decomposition Rate in ml of H2 (25° C./1 min × cm$^2$) | |
|---|---|---|
| | initial | after 100 hours |
| Graphite | 3 | 3 |
| Graphite activated with 2NiO MoO$_3$ | 10 | 10 |
| Molybdenum 99.99% | 60 | 40 |
| Fe (30%)-V (70%) alloy | 75 | 50 |

The results of Table I show that the decomposition rate for the materials of the invention is much greater than graphite and activated graphite and the stability of the material is much greater than molybdenum and the iron-vanadium alloys. This means that the denuders of the invention may be much smaller than conventional denuders for the same capacity which permits a substantial reduction in the amount of mercury required for a mercury chlor-alkali plant with a considerable holdup savings.

Various modifications of the invention may be made without departing from the spirit or scope thereof and it is to be understood that the invention is intended to be limited only as defined in the appended claims.

We claim:

1. A polyphase packing material for alkali metal mercury amalgam denuders comprising a sintered mixture of at least one powdered valve metal boride and at least one valve metal carbide and also containing at least one member of the group consisting of 0.5 to 10% by weight of at least one metal of group VIII of the Periodic Table and 1 to 30% by weight of graphite.

2. The material of claim 1 wherein the valve metal is selected from the group consisting of titanium, tantalum, zirconium, hafnium, niobium, tungsten and silicon and mixtures thereof.

3. The material of claim 1 containing 30 to 80% by weight of valve metal boride and 80 to 30% by weight of valve metal carbide.

4. The material of claim 1 containing 0.5 to 10% by weight of a metal of group VIII of the Periodic Table.

5. The material of claim 1 containing 1 to 30% by weight of graphite.

6. In an alkali metal mercury amalgam denuder comprising a vessel containing a catalytic material, means for introducing alkali metal mercury amalgam at the top, means for introducing water, means for recovering hydrogen and means for removal of aqueous alkali metal hydroxide solution, the improvement comprising using as the catalytic material a polyphase packing material comprising a sintered mixture of at least one powdered valve metal boride and at least one valve metal carbide.

7. The denuder of claim 6 wherein the valve metal is selected from the group consisting of titanium, tantalum, zirconium, hafnium, niobium, tungsten and silicon and mixtures thereof.

8. The denuder of claim 6 containing 30 to 80% by weight of valve metal boride and 80 to 30% by weight of valve metal carbide.

9. The denuder of claim 6 also containing at least one member of the group consisting of 0.5 to 10% by weight of at least one metal of group VIII of the Periodic Table and 1 to 30% by weight of graphite.

10. The denuder of claim 6 containing 0.5 to 10% by weight of a metal of group VIII of the Periodic Table.

11. The denuder of claim 6 containing 1 to 30% by weight of graphite.

12. A method of decomposing alkali metal mercury amalgam comprising contacting an alkali metal mercury amalgam with water in the presence of a polyphase packing material comprising a sintered mixture of at least one powdered valve metal boride and at least one valve metal carbide.

13. The method of claim 12 wherein the valve metal is selected from the group consisting of titanium, tantalum, zirconium, hafnium, niobium, tungsten and silicon and mixtures thereof.

14. The method of claim 12 containing 30 to 80% by weight of valve metal boride and 80 to 30% by weight of valve metal carbide.

15. The method of claim 12 also containing at least one member of the group consisting of 0.5 to 10% by weight of at least one metal of group VIII of the Periodic Table and 1 to 30% by weight of graphite.

16. The method of claim 12 containing 0.5 to 10% by weight of a metal of group VIII of the Periodic Table.

17. The method of claim 12 containing 1 to 30% by weight of graphite.

18. A polyphase packing material for an alkali metal mercury amalgam denuder comprising a sintered mixture of 30 to 80% by weight of at least one valve metal boride, 80 to 30% by weight of at least one valve metal carbide and at least one member of the group consisting of 1 to 30% by weight of graphite and 0.5 to 10% by weight of at least one metal of group VIII of the Periodic Table.

* * * * *